United States Patent Office 3,448,586
Patented June 10, 1969

3,448,586
PROTECTED BURIED MATERIAL AND METHOD OF PROTECTING SAME
Tyson H. Mailen and Roy E. Stansbury, Bartlesville, Okla., assignors to Phillips Petroleum Company, a corporation of Delaware
No Drawing. Filed July 15, 1966, Ser. No. 565,404
Int. Cl. F16l *1/00;* A01n *9/12*
U.S. Cl. 61—72.1                      6 Claims

ABSTRACT OF THE DISCLOSURE

A buried material such as an electric cable having a rubber or plastic covering is protected against rodent damage by adding to the ground or backfill as the cable is buried a rodent repellent material. Although any effective rodent repellent can be used, specifically mentioned in the disclosure are N,N-dimethylsulfonyl dithiocarbonate, for example, N,N-dimethyl-S-methylsulfonyl dithiocarbamate and N,N-dimethyl-S-tert-butyl-sulfonyl dithiocarbamate.

---

This invention relates to a method of protecting a buried material such as an electric cable against rodent damage. It also relates to the protected material, e.g., a cable protected against rodent damage. In one of its concepts the invention provides protection for a buried material such as an electric cable subject to damage by rodents, e.g., pocket gophers, by adding to the backfill adjacent the buried material a material which is repellent to the rodents. In another of its concepts the invention provides protection to a buried material such as an electric cable by adding to the ground as the cable is buried by adding it around the cable a material repellent to rodents. In a further concept of the invention it provides for the addition of an amount of a rodent repellent effective to repel rodents from the area in which a material to be protected is buried to the backfill in which the said material is buried.

Buried materials such as cables have been protected from rodent damage by addition or incorporation of a repellent to or in the outer surface of a cable. When the repellent is added to the surface of the cable, during its manufacture, some damage may, on occasion, be done by the rodent before the repellent drives him away. This is because the rodent must attack the cable to sense the repellent.

We have now conceived that a buried material such as an underground electric cable can be well protected against damage by rodents by treating the ground surrounding or adjacent to the cable with an effective rodent repellent. A rodent repellent which is now preferred is one described in U.S. Patent No. 2,862,850, issued Dec. 2, 1958, Lyle D. Goodhue. The repellent there described is an N,N-dimethylsulfenyl dithiocarbamate, for example, N,N-dimethyl-S-methylsulfenyl dithiocarbamate and N,N-dimethyl-S-tert-butylsulfenyl dithiocarbamate.

The present invention is based at least upon the concept that the repellent shall be placed adjacent to or surrounding the cable so that the rodent is actually working in the soil and coming into contact with or at least under the influence of the repellent before reaching the cable.

The rodent repellent can be applied to the backfill covering the buried object or cable or it can be applied around the object or cable as it is laid into the ground, thus insuring diffusion in the soil of the repellent at or near the cable.

The term "rodent-damageable buried material" is meant to include not only electric cable but also any buried rubber- or plastic-containing material such as conduits, pipes, hoses, barrier sheets, and the like. The term "electric cable" is meant to include any rubber- or plastic-covered wire or conductor, such as electric power cable, seismograph cable, telephone cable, and the like.

Presently, it appears that an amount of repellent in the range of from about 0.1 to about 10 pounds per mile of cable, preferably about 0.25 to about 5 pounds per mile, will yield effective protection.

The repellent can be added as such or dissolved in any suitable solvent or diluent, for example, xylene, diesel oil, kerosene, fuel oil, or as water emulsions or in mixed solvents.

A mixed solvent now preferred is one set forth in Ser. No. 535,668, filed Mar. 21, 1966, by James A. Shotton, now allowed, which application refers to application Ser. No. 343,775, filed Feb. 10, 1964, by William A. Hensley, Jr., now abandoned.

Thus, an object of the invention is to provide a method for protecting a buried material such as an electric cable against rodent damage. Another object of the invention is to treat a soil in which a buried material such as an electric cable is buried so that the soil will be inimical to pests causing cable damage.

Other concepts, objects and the several advantages of the invention are apparent from this disclosure and the apended claims.

According to the present invention, there is provided a method for protecting a buried material such as an electric cable against pest or rodent damage which comprises treating the soil or ground in which the material or cable is or will be buried with a material inimical or repellent to rodents or pests which may cause damage to said material or cable.

Further, according to the invention, the repellent can be applied to the material object or cable as it is laid into the ground, or injected into the ground, after the item has been actually buried.

Thus, it is also within the scope of the present invention to inject into the ground the repellent adjacent to the buried cable or other item.

The following are examples according to the invention:

EXAMPLE I

Five test pairs of cable were buried in trenches in a pocket gopher infested area. One of each pair was in a trench in which the backfill was untreated and the other was in a trench in which the backfill was treated with a No. 1 fuel oil solution of N,N-dimethyl-S-tert-butylsulfenyl dithiocarbamate applied at the rate of 4.65 pounds of repellent per mile of cable. Inspection after 48 days revealed that only cable in the untreated backfill had been damaged by the gophers.

EXAMPLE II

Eight test pairs of cable were buried in trenches in a different pocket gopher infested area from that of Example I. One of each pair was in a trench in which the backfill was untreated and the other was in a trench in which the backfill was treated with a kerosene solution of N,N-dimethyl-S-tert-butylsulfenyl dithiocarbamate applied at the rate of 1.7 pounds of repellent per mile of cable. Inspection after 35 days revealed that only cable in the untreated backfill had been damaged by the gophers.

EXAMPLE III

The effectiveness against Norway rats of the impregnation of soil with repellent was tested by spraying the burrows and the soil around building foundations with sufficient repellent solution of Example II to wet the burrow entrance or foundation. The rates abandoned their burrows, and ceased digging around the foundations.

In the examples, the repellent was prepared in a 10 weight percent xylene solution, which was then diluted with the indicated solvent to give the indicated application rate.

The examples illustrate the invention preferred methods of operation which are now considered the best mode of applying the repellent and the preferred repellent.

Reasonable variation and modification are possible within the scope of the foregoing disclosure and the appended claims to the invention, the essence of which is that a repellent, particularly a rodent repellent such as herein set forth and described, is added to the ground adjacent a buried object or material, for example, an electric cable.

We claim:

1. A method for simultaneously burying and protecting from rodent damage a rodent-damageable manufactured electric cable, conduit, pipe, hose, barrier sheet, or the like material which is to be buried in rodent infested ground by man and is constituted at least in part of a rubber or plastic containing substance which comprises placing said material in a trench while substantially simultaneously adding to the trench backfill soil adjacent said material as it is being buried an amount of an N,N-dimethylsulfenyl dithiocarbamate rodent repellent effective therein to repel said rodents.

2. A method according to claim 1 wherein the material repellent to said rodent is one of N,N-dimethyl-S-methylsulfenyl dithiocarbamate and N,N-dimethyl-S-tert-butylsulfenyl dithiocarbamate.

3. A method according to claim 1 wherein the material to be protected is an underground electric cable having a covering of a rubber or plastic containing substance and the repellent is added to the backfill burying the cable.

4. A method according to claim 3 wherein the repellent is fed around the cable as it is being buried.

5. A method according to claim 1 wherein the rodent-damageable material is an electric cable having a covering of a rubber or plastic material and it is protected by adding to the backfill surrounding the same an amount effective to repel the rodent of N,N-dimethyl-S-tert-butylsulfenyl dithiocarbamate.

6. A method according to claim 1 wherein the rodent-damageable material is an electric cable which is constituted at least in part of a rubber or plastic containing substance, the backfill surrounding the buried cable is treated with the rodent repellent which is applied to the backfill by feeding said repellent to the backfill around the cable as it is being buried, thus causing diffusion into the backfill immediately adjacent the cable.

References Cited

UNITED STATES PATENTS

| | | | |
|---|---|---|---|
| 3,201,944 | 8/1965 | Christensen | 61—72.5 |
| 1,829,162 | 10/1931 | Solter et al. | 61—72.6 |
| 2,222,638 | 11/1940 | Szilard | 174—116 |
| 2,222,639 | 11/1940 | Prik | 174—121 |
| 2,390,713 | 12/1945 | Hunt | 167—22 XR |
| 2,598,989 | 6/1952 | Goodhue et al. | 167—22 |
| 2,621,143 | 12/1952 | Goodhue et al. | 167—22 |
| 2,862,850 | 12/1958 | Goodhue | 167—46 |
| 2,941,879 | 6/1960 | Goodhue | 71—2.7 |
| 3,269,902 | 8/1966 | Goodhue et al. | 167—46 |

FOREIGN PATENTS 207,353    3/1957    Australia.

OTHER REFERENCES

Keith, J. O., et al.: J. Wildl. Manage. 23(2): 137–145, April 1959, "Effect of 2,4-D on Abundance and Foods of Pocket Gophers."

Ward, W. A., et al.: U.S. Dept. Int. Fish and Wildlife Service Special Scientific Report Wildlife No. 47: 1–7 (1960), "The Burrow Builder and its use for Control of Pocket Gophers."

Kepner, R. A., et al.: Univ. Calif. Agr. Ext. Serv. Pub. Axt–32: 1–12 (1961), "U.C. Mechanical Gopher-Bait Applicator, Construction and Use."

Tietjen, H. P., et al.: Ecology 48(4): 634–643, summer 1967, "2,4-D Herbicide, Vegetation, and Pocket Gopher Relationships, Black Mesa, Colorado."

Marsh, R. E., et al.: Univ. Calif. Agr. Ext. Serv. Pub. Axt–261: 1–8 (January 1968), "Pocket Gopher Control With Mechanical Bait Applicator."

Proceedings Vertebrate Pest Control Conference, Sacramento, Calif., Feb. 6–7, 1962, published 1962 by National Pest Control Association, 250 W. Jersey St., Elizabeth, N.J., pp. 68, 71, 99, 101, 102, 109, 117, 121, 122, 123, 166, 235, 236.

LEWIS GOTTS, *Primary Examiner.*

S. K. ROSE, *Assistant Examiner.*

U.S. Cl. X.R.

43—124; 47—25, 32; 52—517, 742; 61—72.5, 72.6, 72.7; 424—300

UNITED STATES PATENT OFFICE
CERTIFICATE OF CORRECTION

Patent No. 3,448,586                                June 10, 1969

Tyson H. Mailen et al.

It is certified that error appears in the above identified patent and that said Letters Patent are hereby corrected as shown below:

Column 1, line 18, "N,N-dimethylsulfonyl" should read -- N,N-dimethylsulfenyl --; line 19, "thiocarbonate" should read -- thiocarbamate --; lines 20 and 21, "fonyl", each occurrence, should read -- fenyl --.

Signed and sealed this 17th day of March 1970.

(SEAL)
Attest:

Edward M. Fletcher, Jr.                      WILLIAM E. SCHUYLER, JR.

Attesting Officer                                  Commissioner of Patents